United States Patent [19]

Belanger

[11] 4,258,762
[45] Mar. 31, 1981

[54] APPARATUS FOR DELIMBING TREES

[76] Inventor: Donald Belanger, Rté. 7, Box 359, International Falls, Minn. 56649

[21] Appl. No.: 127,406

[22] Filed: Mar. 5, 1980

[51] Int. Cl.³ .............................................. A01G 23/02
[52] U.S. Cl. .............................. 144/2 Z; 144/309 AC
[58] Field of Search ................... 144/2 Z, 3 D, 34 R, 144/208 R, 208 J, 312, 309 AC; 83/928

[56] References Cited

U.S. PATENT DOCUMENTS

| | | | |
|---|---|---|---|
| 3,329,184 | 7/1967 | Longert | 144/2 Z |
| 3,398,774 | 8/1968 | Hahn | 144/2 Z X |
| 3,414,027 | 12/1968 | Larva, Sr. et al. | 144/3 D X |
| 3,643,708 | 2/1972 | Lindblom | 144/2 Z |
| 3,672,413 | 6/1972 | Jouppi | 144/2 Z |
| 3,967,663 | 7/1976 | Lolgerot | 144/2 Z |
| 3,972,357 | 8/1976 | Neal et al. | 144/2 Z |

FOREIGN PATENT DOCUMENTS 339033 12/1972 U.S.S.R. ................................ 144/2 Z

Primary Examiner—W. D. Bray
Attorney, Agent, or Firm—Victor J. Evans & Co

[57] ABSTRACT

A tree delimber including a frame having a track for guidably supporting a carriage having a boom and grapple assembly thereon, the carriage being driven for movement on the track between the ends of the frame with a tree delimbing assembly at one end of the frame having an articulated chain with blades and an articulated arm with blades which completely surround the peripheral surface of a tree trunk positioned in the tree delimbing assembly by the boom and grapple assembly. The carriage is provided with jaws for gripping the butt end of a tree trunk so that when the carriage is driven along the track, the tree trunk is pulled along the frame through the tree delimber assembly permitting the blades to remove the limbs from the peripheral surface of the tree trunk.

12 Claims, 8 Drawing Figures

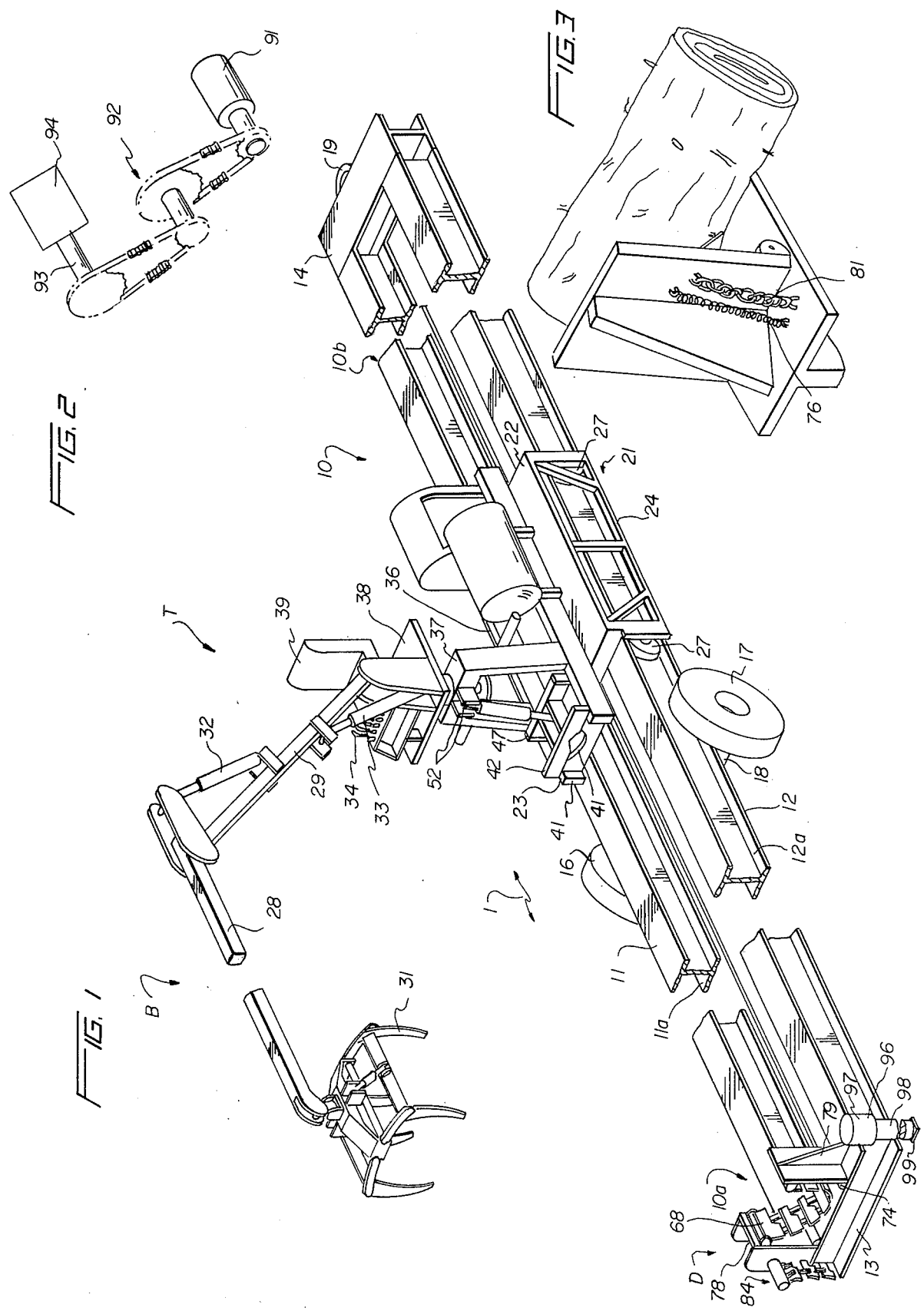

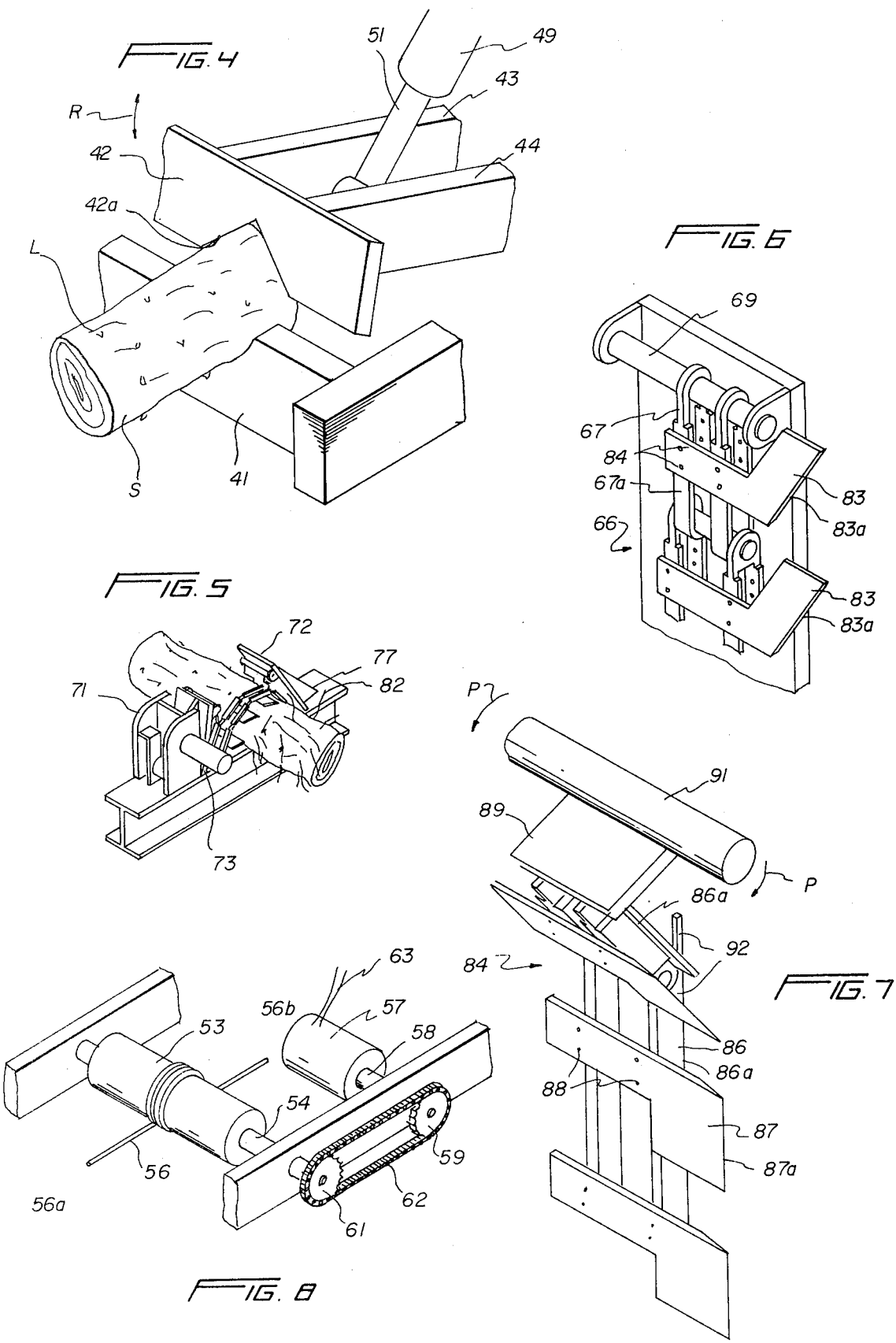

APPARATUS FOR DELIMBING TREES

BACKGROUND OF THE INVENTION

In the lumber industry, the harvesting of trees, which usually takes place in remote, heavily forested areas, is characterized by many preliminary operations subsequent to the felling of the trees before the trees are ready to be processed into lumber. One such preliminary operations involves the removal of limbs from the trees. The common practice today in most tree harvesting operations is to partially delimb the trees with a power saw at the point where they have been felled. Such partially delimbed trees are then dragged through the dirt and sand and pushed into piles with a skidder. Both these dragging and pushing operations coat the trees with dirt and when a power saw is used subsequently to cut the trees into eight foot lengths and to complete the delimbing operation on the trees, the blades of the power saws are dulled quickly because of the dirt. In addition, the accumulation of dirt on the tree is highly objectionable to those companies which process the trees into products such as paper. Other problems are encountered in tree harvesting operations such as there being only an intermittent use made of logging equipment, including skidders and faller bunchers so that such equipment is frequently idle adding to the cost of the harvesting of trees. Under present day circumstances, the skidder operator spends the majority of his time off the skidder delimbing trees by hand with a power saw or pushing or piling the trees with the skidder instead of skidding.

Various machines have been proposed to delimb trees but all of such present day delimbing machinery is characterized by certain disadvantages. Although such delimbing machinery utilizes various arrangements for feeding a tree through a delimbing apparatus, the delimbing operation performed by such machinery is inadequate and is not only characterized by a slow production rate but is usually quite complicated in construction and operation so as to be subject to frequent breakdown. In addition, such present day delimbing machinery accumulates piles of removed limbs which must be removed periodically by equipment such as a skidder, but additionally randomly deposits delimbed trees in the machine area which must be moved and piled by additional equipment.

OBJECTS AND SUMMARY OF THE INVENTION

Accordingly, a primary object of this invention is to provide a new and novel apparatus for delimbing trees which produces thoroughly delimbed tree trunks of highly acceptable quality to the ultimate processer of the tree.

Another object of this invention is to provide a new and novel apparatus for delimbing trees which is inexpensive and simple in construction, may be operated by a single operator and which is characterized by a high production rate.

A further object of this invention is to provide a new and novel apparatus for delimbing trees which not only carries out a tree delimbing operation in a highly efficient manner but permits easy removal to a convenient location of the removed limbs while enabling the piling of the delimbed tree trunks in a convenient, neatly stacked pile thereby preventing the intermixing of the limbs and delimbed tree trunks.

Still another object of this invention is to provide a new and novel apparatus for delimbing trees which is extremely simple to operate by a single operator, which is readily transportable to and from a point of use and which eliminates the use of power saws for the delimbing operation.

The objects stated above and other related objects are accomplished by the provision of a frame having a longitudinally extending track in which a carriage is guidably supported and driven in opposite directions between the ends of the frame. A boom and grapple assembly is mounted on the carriage together with means for releasably gripping the butt end of a tree trunk in a forward position of the carriage on the frame. A tree delimbing assembly is disposed on one end of the frame through which the tree may be drawn by the carriage for delimbing during the movement of the carriage along the track. The tree delimbing assembly includes first flexible blade assembly which is yieldably mounted so that the first blade assembly encircles the underside and side portions of the peripheral surface of a tree trunk positioned in the tree delimbing assembly and a second flexible blade assembly arranged to be moved into overlying relationship with the upper portion of the tree trunk peripheral surface so that as the carriage draws the tree through the tree delimbing assembly during its rearward movement, the blades on the first and second blade assemblies completely strip the limbs from the peripheral surface of the tree trunk.

Other objects and advantages of the invention will become apparent when viewed in the light of the following description in conjuction with the accompanying drawings.

BRIEF DESCRIPTION OF THE DRAWINGS

FIG. 1 is a perspective view of the tree delimbling apparatus of the invention;

FIG. 2 is a perspective view of a portion of the apparatus of FIG. 1;

FIG. 3 is a perspective view of a portion of the tree delimbing assembly incorporated in the apparatus of FIG. 1;

FIG. 4 is a perspective view of the tree trunk gripping device incorporated in the apparatus of FIG. 1;

FIG. 5 is a perspective view of the tree delimbing assembly incorporated in the apparatus of FIG. 1;

FIG. 6 is a perspective view of a portion of the tree delimbing assembly of FIG. 5;

FIG. 7 is a perspective view of another portion of the tree delimbing assembly of FIG. 5; and FIG. 8 is a perspective view of the carriage driving mechanism incorporated in the apparatus of FIG. 1.

DESCRIPTION OF THE PREFERRED EMBODIMENT

Referring now to the drawings and to FIG. 1 in particular, there is shown an apparatus for delimbing trees constructed in accordance with the invention and designated generally by the letter T. The apparatus T includes a frame designated generally by the reference numeral 10 having a front end 10a and a rear end 10b. The frame 10 includes a pair of laterally spaced tracks 11, 12 preferably in the form of I-beams interconnected at their ends in the relationship shown by means of cross-beams 13, 14. The frame 10 is arranged to be supported in an elevated position on a supporting surface such as the ground adjacent the point of use and, in the illustrated embodiment, transport means in the form of wheels 16, 17 supported on an axle 18 and provided intermediate the ends of the frame 10. In addition, in order to move the frame 10 on the wheels 16, 17 over the supporting surface, a tractor hitch 19 is provided on the rear end 10b of the frame 10 for attachment to a prime mover such as a tractor or the like.

The apparatus T includes a carriage 21 which comprises a base plate 22 having downwardly depending side frames 23, 24 extending over the side portions of the tracks 11, 12 respectively to permit sliding movement of the carriage 21 between the front end 10a and the rear end 10b of the frame 10 as indicated by the double arrow I.

In order to support the carriage 21 for sliding movement on the tracks 11, 12 the carriage side portions 23, 24 are provided with wheels 26, 27 arranged in longitudinally spaced relationship for rolling engagement with the flanges 11a, 12a of the tracks 11, 12 respectively as shown in FIG. 1.

A boom and grapple assembly designated generally by the letter B is mounted on the base plate 22 of the carriage 21 the boom and grapple assembly B being of conventional construction including boom members 28, 29 suitably interconnected by pivot means as shown with a grapple 31 connected to the outer end of the boom member 28 in a well known manner. Hydraulically operated cylinders 32, 33 are connected to the boom members 28, 29 and the movement of the boom and grapple assembly B is controlled hydraulically by means of suitable levers in a control arrangement 34 as well known. The boom and grapple assembly B is mounted on the carriage 21 by means of a base frame 36 suitably secured to the base plate 22 and is arranged to support a pedestal 37 on the upper end of which is pivotally mounted a platform 38 provided with an operators seat 39 adjacent the control arrangement 34.

Means are provided on the carriage 21 for releasably gripping the butt end of a tree trunk S having limbs as shown best in FIG. 4. More specifically, a pair of jaws 41, 42 are supported on the base frame 36, the lower jaw 41 being provided with an arcuate recess 41a for accommodating the butt end of a tree trunk S as shown in FIG. 4. The upper jaw 42 is preferably provided with an inverted V-shaped recess 42a and is pivotally mounted on the base frame 36 by means of laterally spaced arms 43, 44 interconnected at their opposite ends by a crossbar 47 pivotally supported on the base frame 36 as shown in FIG. 1.

Means are provided for moving the upper jaw 42 in the direction of the double arrow R upwardly for insertion of the tree trunk butt end in the recess 41a and downwardly for gripping engagement with the butt end by the inverted V-shaped recess 42a in jaw 42 as shown in FIG. 4. More specifically, a hydraulic cylinder 49 is provided having a piston 51 connected at its outer end between the arms 43, 44 with the opposite end of the cylinder 49 pivotally connected to brackets 52 mounted on the pedestal 37. Suitable hydraulic conduits are provided for actuating the cylinder 49 utilizing associated levers within control arrangement 34 for moving the jaws 41, 42 into and out of clamping engagement with the butt end of the tree trunk S.

Means are provided for moving the carriage 21 in the direction of the double arrow I also using selected levers within the control arrangement 34. More specifically, and as shown best in FIG. 8, a cable drum 53 is rotatably mounted on the carriage 21 by means of a shaft 54 and a cable 56, wrapped around the drum 53 in a plurality of wraps, extends in opposite directions. The cable 56 is connected at its ends 56a, 56b to the opposite ends of the frame 10 as shown in FIG. 1. The cable drum 53 is arranged to be rotated by means including a hydraulic motor 57 having an output shaft 58 suitably mounted on the carriage 21 and is drivably connected by means of sprockets 59, 61 and a chain 62 to the shaft 54 of the cable drum 53. The output shaft 58 of the hydraulic motor 57 may be selectively rotated in either direction pressurized fluid conducted through conduits 63 utilizing valves and the like under the control of suitable levers included in the control arrangement 34. Thus, rotation of the output shaft 58 of the hydraulic motor 57 in either a clockwise or counterclockwise direction thereby moves the carriage in either direction along the tracks 11, 12.

The apparatus T of the invention includes a tree delimbing assembly designated generally by the letter D which is suitably supported at the front end 10a of the frame 10 as shown best in FIG. 1. The tree delimbing assembly D includes flexible blade means which completely encircle the peripheral surface of the tree trunk S when a tree trunk is positioned therein as shown in FIG. 5. The flexible blade means of the tree delimbing assembly D include a first flexible blade assembly 66 as shown partially in detail in FIG. 6.

The first flexible blade assembly 66 comprises a chain 67 having a plurality of articulated links 67a and the chain 67 is connected at opposite ends to rods 68, 69 supported on a pair of laterally spaced upstanding brackets 71, 72 respectively so that the chain 67 hangs downwardly in an arcuate configuration between the brackets 71, 72 as shown best in FIG. 1. Brackets 71, 72 are each arranged for pivotal movement towards each other on pivot rods 73, 74 as shown in FIG. 5 and means are provided in the form of springs 76, 77 on each of the brackets 73, 74 respectively which yieldingly urge the brackets into the upright position shown in FIG. 4. Stop plates 78, 79 are provided on the brackets 73, 74 which engage the frame and move particularly, the cross member 13 thereby limiting the pivotal movement of the brackets 73, 74 to this upright position under the action of the springs 76, 77 respectively. Furthermore, the inwardly pivotal movement of the brackets 71, 72 is preferably limited by means of chains 81, 82 connected at opposite ends to the brackets 71, 72 respectively and the frame 10.

Each of the links 67a of the chain 67 is provided with a blade 83 suitably secured thereto by means such as rivets 84 and each of the blades 83 are provided with a cutting edge 83a. Thus, the blades 83 are arranged to extend substantially parallel with the peripheral surface of the tree trunk S positioned in the tree delimbing assembly D for engagement of the cutting edges 83a of the blades 83 with the limbs L on the tree trunk S positioned within the tree delimbing assembly D as shown in FIG. 5.

The flexible blade means of tree delimbing assembly D also comprises a second flexible blade assembly 84 which includes a flexible arm 86 comprising the plurality of articulated links 86a on each of which is mounted a blade 87 by means such as rivets 88 each of the blades 87 having a cutting edge 87a. The blades 87 are configured similarly to the blades 83 on the chain 67 of the first flexible blade assembly 66. Preferably, the first flexible blade assembly 66 is provided with seven blades 83 and the second flexible blade assembly 84 is provided with three blades 87. The upper end of the second flexible blade assembly 84 which hangs loosely downward, is connected by means of a bracket 89 suitably mounted on a shaft 91 which is rotatably mounted in the left hand bracket 73 for rotation in the direction of the arrow P as viewed in FIG. 1.

Means are provided for rotating the shaft 91 and, as shown best in FIG. 2, there is provided a chain and sprocket drive 92 drivably connected between the rod 91 and the output shaft 93 of a drive motor 94. In the preferred embodiment, the drive motor 94 may be battery operated and radio controlled by a modified garage door opener activated by the operator from seat 39. The links 86 on the second flexible blade assembly 84 (except the link 86 connected to the bracket 89) are provided with extensions 92 for interengagement with the adjacent link so that as the shaft 91 is rotated, the links 86 are temporarily rigidified throughout a predetermined rotary angle of the assembly 84 thereby permitting the assembly 84 to fall downwardly by gravity into overlying engagement with the upper portion of the peripheral surface of the tree trunk S.

Preferably, the shaft 91 is rotatable in both the clockwise direction as indicated by the P and a counterclockwise direction as indicated by the arrow P' in FIG. 7 under the control of the operator from the seat 39. There are two advantages obtained by a clockwise and counterclockwise rotation of shaft 91. One advantage is in the ability to delimb several trees before removing the pile of delimbed branches. After one tree is completely delimbed, the operator pushes the button which reverses the shaft 91 and arm 26. Otherwise, after one or two trees have been delimbed, the arm 86 could get hung up on the pile of limbs on the ground at one end of the machine. With the ability to rotate counterclockwise, the operator can continue to delimb six or seven more trees before removing the limbs from the end of the frame off into a pile clear of the machine. This advantage triples production, because the operator spends less time clearing away the old limbs and spends more time delimbing trees.

The other important advantage of being able to move the arm 86 counterclockwise is when delimbing a tree, which is longer than the frame 10, the arm 86 can be reversed so it can be lifted off the tree. The tree can then be lifted out of the delimber assembly D. Otherwise, the arm 86 would stay on top of the tree due to the trees' length and the operator might have to lift the tree out with the arm 86 still resting on top of the tree.

The frame 10 of the tree delimbing apparatus D is also provided with stabilizing devices 96 suitably mounted at each of the four corners of the frame which includes an outer sleeve 97 and a telescoping inner sleeve 98 having a foot 99 thereon. Thus, when the apparatus T has been positioned at the point of use for operation, the inner sleeves 98 are moved downwardly so that feet 99 engage the supporting surface to stabilize the apparatus T during its use.

In the operation of the invention, a tree trunk S with limbs thereon is picked up by the butt end by the grapple 31 of the boom and grapple assembly B and placed into the tree delimbing assembly D butt end first as shown in FIG. 4. The weight of the tree trunk S on the first flexible blade assembly 66 moves the chain 67 around the underside and side portions of the peripheral surface of the tree trunk S as permitted by the inward pivotal movement of the brackets 71, 72 as shown best in FIG. 3. The blades 83 thus are moved into substantially parallel relationship with the peripheral surface of the tree trunk S. The motor 94 of the second flexible blade assembly 84 is then actuated by a suitable button adjacent the operator's seat to rotate shaft 91 in the direction of the arrow P so that the dangling articulated chain of the assembly 84 is moved upwardly with resulting engagement between the extensions 92 and the articulated links 86 to subsequently fall by gravity into overlying relationship with the upper surface of the tree trunk S with the blades 87 extending substantially parallel to the tree trunk S. Thus, the first and second flexible blade assemblies completely surround the peripheral surface of the tree trunk S.

The carriage 21 is then moved towards the butt end of the tree trunk S with the jaws 41, 42 in the open position utilizing the hydraulic motor 57 so that the butt end of the tree trunk S is positioned between the jaws 41, 42. The jaws are then moved into clamping engagement with the tree trunk butt end by actuation of the hydraulic cylinder 49 utilizing the associated lever control within the arrangement 34. The carriage 21 is therefore now positioned adjacent the front end 10a of the frame 10.

The carriage 21 is then moved in the opposite direction towards the rear end 10b of the frame 10 to drag the tree trunk S along the frame 10 so that the blades 83, 87 of the first and second flexible blade assembly 66, 84 respectively cut the limbs off the tree trunk S. The limbs which have been thereby cut from the tree trunk S fall on the ground in a pile at the end of the apparatus and the operator may then use the boom and grapple assembly B to remove the cut limbs to a convenient position adjacent the apparatus T where a skidder may be used to push them out of the way. At the same time, the grapple 31 of the boom and grapple assembly is used to pick up the tree trunk stripped of limbs from the frame 10 moving it over to a convenient position adjacent the apparatus T and piling such delimbed tree trunks in a convenient stack for subsequent removal.

What is claimed is:

1. Apparatus for delimbing trees comprising, in combination, a frame including a longitudinally extending track, a carriage supported on said frame for movement along said track, a boom and grapple assembly on said carriage, means for driving said carriage along said track reciprocally between the end of said frame, means on said carriage for releasably gripping the butt end of a tree trunk to advance said tree trunk along said frame during the movement of said carriage along said track, a tree delimbing assembly adjacent one end of said frame, said tree delimbing assembly including flexible blade means, means for supporting said flexible blade means to permit said flexible blade means to encircle the entire peripheral surface of a tree trunk positioned by said boom and grapple assembly in said tree delimbing assembly whereby said movement of said carriage by said driving means from said one end of said frame with said gripping means in gripping engagement with the butt end of said tree grunk towards the other end of said frame permitting said flexible blade means to cut the limbs from the entire peripheral surface of said tree trunk.

2. Apparatus in accordance with claim 1 wherein said flexible blade means include a first flexible blade assembly, yieldably mounted means for supporting said first flexible blade assembly to permit said first flexible blade assembly to encircle the underside and side portions of the peripheral surface of a tree trunk in said tree delimbing assembly and a second flexible blade assembly and means for moving said second flexible blade assembly into overlying relationship with the upper portion of said tree trunk peripheral surface.

3. Apparatus in accordance with claim 2 wherein said first flexible blade assembly comprises a chain having a plurality of articulated links and a plurality of cutting blades each having a cutting edge mounted on said chain links arranged to be disposed in substantially parallel relationship with said underside and side portions of the peripheral surface of a tree trunk in said tree delimbing assembly, and wherein the ends of said chain are connected to said yieldably mounted means.

4. Apparatus in accordance with claim 3 wherein said yieldably mounted means comprises a pair of brackets pivotally mounted on said frame in spaced-apart relationship for accommodating a tree trunk therebetween, each of said brackets having an upper end connected to one end of said chain and means for yieldingly urging said brackets into a stop position on said frame in the absence of a tree trunk in said tree delimbing assembly and for yieldingly permitting pivotal movement of said brackets inwardly towards each other as a result of the weight of said tree trunk accommodated between said brackets on said chain.

5. Apparatus in accordance with claim 4 including means for limiting said inwardly pivotal movement of said brackets to a predetermined stop position.

6. Apparatus in accordance with claim 2 wherein said second flexible blade assembly comprises a flexible arm having a plurality of articulated links, a plurality of cutting blades each having a cutting edge mounted on said arm links arranged to be disposed in substantially parallel relationship with said upper portion of said peripheral surface of a tree trunk in said tree delimbing assembly, said flexible arm being connected at one end to said second blade assembly moving means.

7. Apparatus in accordance with claim 6 wherein said second flexible blade assembly moving means comprises a shaft rotatably mounted on said frame, said shaft being disposed in substantially parallel relationship with the longitudinal axis of said frame, means for rotating said shaft a radially extending bracket on said shaft said one end of said flexible arm having one link connected to said bracket whereby the rotation of said shaft by said shaft rotating means moves said flexible arm into said overlying relationship with said upper portion of said tree trunk peripheral surface.

8. Apparatus in accordance with claim 7 including an extension member on each of the other of said links of said flexible arm for engagement with the adjacent link during a predetermined portion of the rotation of said shaft to thereby temporarily rigidfy said arm throughout a predetermined rotary urge for movement of said arm into said overlying relationship with said upper portion of said tree trunk peripheral surface.

9. Apparatus in accordance with claim 8 including wheel means on said frame for transport of said apparatus on a supporting surface and a hitch on said frame for connecting said frame to a prime mover.

10. Apparatus in accordance with claim 9 including retractable stabilizer means on said frame for engagement with a supporting surface during the operation of said apparatus.

11. Apparatus in accordance with claim 10 wherein said carriage driving means comprises a cable drum rotatably mounted on said carriage, a hydraulic motor drivably connected to said drum, a cable operatively associated with said drum and connected at opposite ends to a respective end of said frame and means for controlling said hydraulic motor to retate said drum in a selected direction to move said carriage in a selected direction on said track.

12. Appratus in accordance with claim 1 wherein said means for gripping the butt end of said tree trunk comprises a pair of jaws movable into and out of gripping engagement with said tree trunk butt end and means for controlling the operation of said jaws.

* * * * *